United States Patent [19]

Jones

[11] Patent Number: 4,929,055
[45] Date of Patent: May 29, 1990

[54] ANTI-REFLECTION TECHNIQUE

[76] Inventor: Peter W. J. Jones, 70 Oakley Rd., Belmont, Mass. 02178

[21] Appl. No.: 246,436

[22] Filed: Sep. 19, 1988

[51] Int. Cl.⁵ .............................................. G02B 27/00
[52] U.S. Cl. ................................ 350/276 R; 350/319
[58] Field of Search ............ 350/276 R, 276 SL, 284, 350/322, 319

[56] References Cited

U.S. PATENT DOCUMENTS

| | | | |
|---|---|---|---|
| 4,342,821 | 8/1982 | Galves et al. | 350/276 SL |
| 4,506,953 | 3/1985 | Shinuzu et al. | 350/276 R |
| 4,772,096 | 9/1988 | Kai et al. | 350/276 R |
| 4,772,097 | 9/1988 | Takeuchi et al. | 350/319 |

Primary Examiner—Bruce Y. Arnold
Assistant Examiner—Loha Ben
Attorney, Agent, or Firm—Robert F. O'Connell

[57] ABSTRACT

A structure for use in reducing reflections as from a light reflecting surface of an optical device. The structure utilizes a plurality of substantially tubular elements mounted in front of the reflective surface. In a preferred embodiment, the aspect ratio of the tubular elements being selected to be substantially the same as that of the optical device.

22 Claims, 3 Drawing Sheets

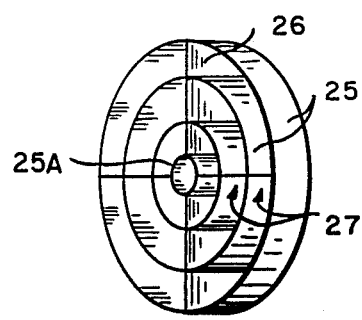 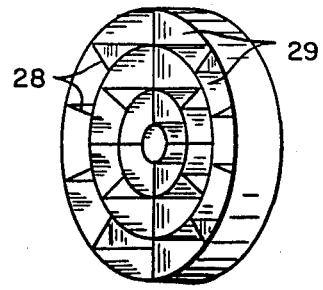
FIG.8    FIG.9
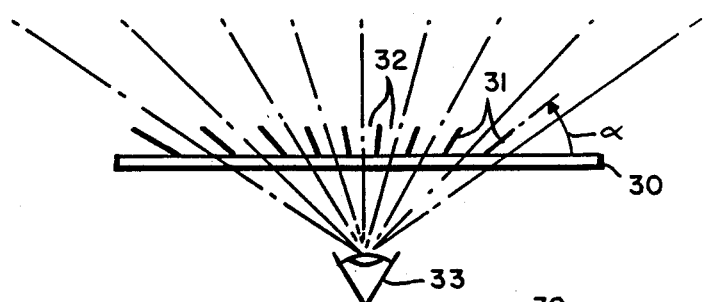
FIG.10
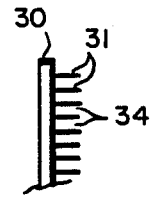
FIG.11
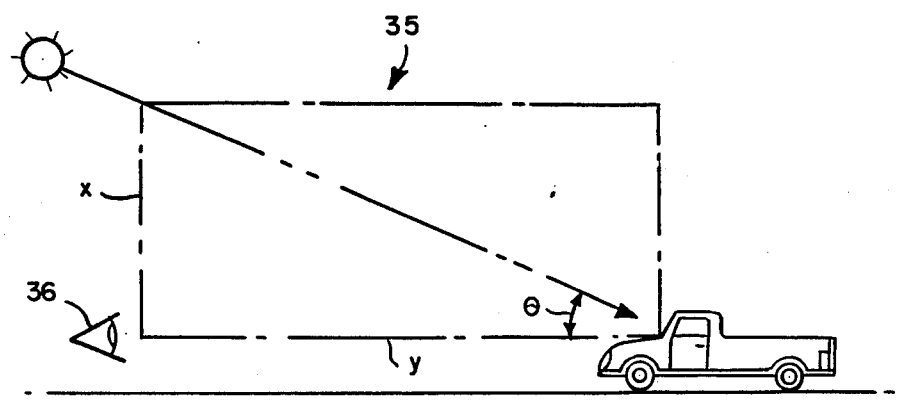
FIG.12

ANTI-REFLECTION TECHNIQUE

INTRODUCTION

This invention relates generally to techniques for the minimization of light reflections from reflective surfaces and, more particularly, to the prevention of light reflections from the reflective surfaces of optical or other devices.

BACKGROUND OF THE INVENTION

When using optical devices, for example, for ranging, guidance, communication or information gathering, such as binoculars, telescopes, periscopes, rifle scopes and the like, in daylight hours and particularly in sunlight, reflections of the sunlight can be readily observed. The observation of such reflections can be especially troublesome and even dangerous, for example, during warfare when such devices are being used in a battleground situation. Reflective flashes of light, for example, can alert enemy observers as to the location of personnel and/or equipment and permit fire, or other retaliating measures, to be directed at such locations.

Reflections may also be a problem at night, from moonlight or artificial light sources, as when night vision devices are being used by observers. Such reflections can also occur from other optically reflective surfaces, such as mirrors and headlamps on vehicles, and the like, to the detriment of field troops in the vicinity thereof. Such reflection problems have become even more serious lately for battlefield troops with the introduction of scanning laser beams used in locating and/or ranging devices, which beams can produce relatively high intensity and readily indentifiable reflections from glass or other mirror or mirror-like surfaces.

At present, the only practical solutions available have been to avoid using the optical devices in question, at least when the sun or other light source is in front of the reflective surface, or to cover up the reflective surfaces in some manner, or remove the optical devices or other reflective surfaces entirely, or to use an optical shade, or hood, adapted to fit on a device in much the same manner as a camera lens hood or shade is fitted to a camera lens.

An obvious disadvantage of the use of some of the above solutions is to eliminate or seriously reduce the information gathering capabilities of the field forces which depend upon such information to improve their effectiveness. Further, personnel may not remember, or be able, to remove, cover up, or otherwise neutralize or minimize the reflectiveness of the surfaces involved.

Moreover, many optical devices, such as binoculars, telescopes, and the like, have a relatively narrow field of view. Accordingly, the use of a standard-type lens shade having an aspect ratio that adequately corresponds to such narrow field of view so as to prevent undesired reflections is impractical since it results in a relatively long and extremely cumbersome lens shade. For example, for 10×50 binoculars, a suitable lens shade would be over two feet long, with even longer shades required for higher power devices. Such an approach becomes entirely impractical for most, if not all, situations.

Accordingly, it is highly desirable, if not necessary, to devise other techniques for substantially preventing reflections from the reflecting surfaces of optical or other devices due to the incidence thereon of sunlight, laser beams, or other light sources.

SUMMARY OF THE INVENTION

In accordance with the invention, a structure comprising a plurality of tubular elements is positioned in front of a light reflecting surface of an optical device, each of the tubular elements having a selected cross-sectional configuration. The tubular elements form a grid-like, or honeycomb-like, or other similar, structure. The aspect ratio of each of the elements has a selected relationship with respect to the aspect ratio of the field of view of the optical device on which the structure is positioned. Accordingly, reflections from light sources generally in front of the device are substantially reduced.

BRIEF DESCRIPTION OF THE DRAWINGS

The invention can be described in more detail with the help of the accompanying drawings wherein:

FIGS. 8 and 9 depict still further alternative embodiments of the invention using circular rings;

FIG. 10 depicts a top diagrammatic view of a use of the invention for an exemplary windshield structure;

FIG. 11 depicts a side diagrammatic view of the structure of FIG. 10; and

FIG. 12 depicts diagrammatically the geometric relationship of the aspect ratio of the embodiment shown in FIGS. 10 and 11 to the elevation angle of the sun.

DESCRIPTION OF THE PREFERRED EMBODIMENTS

Figure 1:
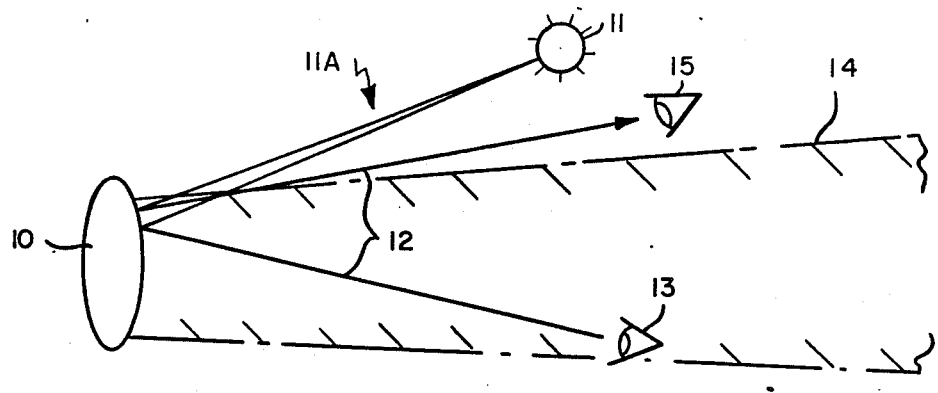
FIG. 1 depicts diagrammatically the geometry of a typical situation in which reflections from an optical device can occur.

As can be seen in FIG. 1, a typical front lens 10 of an optical device (the remainder of which is not shown) acts as a highly reflective surface for reflecting rays of light from a light source 11 in front of the lens, which source may be, for example, the sun or an artificial light source, such as a laser beam source. The incident light, e.g. as shown by exemplary rays 11, is reflected from the surface of lens 10, as depicted by exemplary rays 12, to a viewer 13 who is within, or a viewer 15 who is outside, the field of view of the device, which is shown, for example, by dashed line 14. Thus, such observers can readily detect the location of the optical device by observing the reflections that are so produced.

Figure 2:
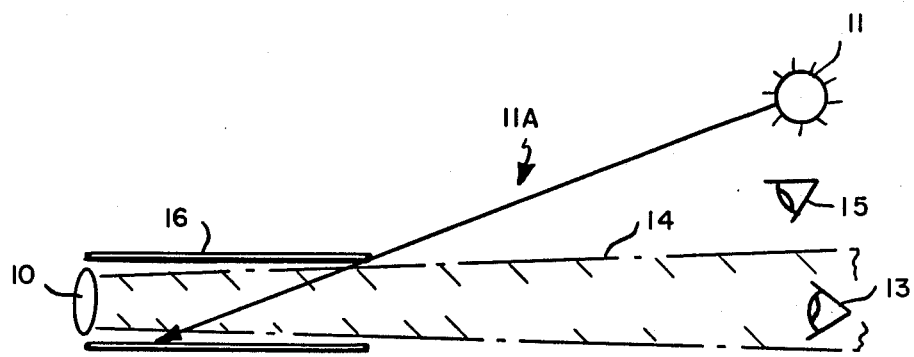
FIG. 2 diagrammatically illustrates the use of an optical lens hood for reducing reflections from an optical device.

FIG. 2 shows a proposed technique of the prior art for preventing such reflections by the use of a conventional lens hood 16 positioned in front of the lens 10. Observers 13 and 15, both inside and outside the field of view 14, will not see reflections from a light source 11 positioned outside the field of view as shown. Moreover, observers outside the field of view will not see reflection from a light source with the field of view. However, in order to obtain such operation, the lens hood 16 has to be made relatively long (perhaps as long as, or longer than, two feet for a typical 10×50 lens as mentioned above) in order to be sufficiently effective in preventing observers from seeing such reflections. Such an inordinately long lens hood would be entirely too awkward and cumbersome for most applications and is particularly impractical for field use applications.

Figure 3:
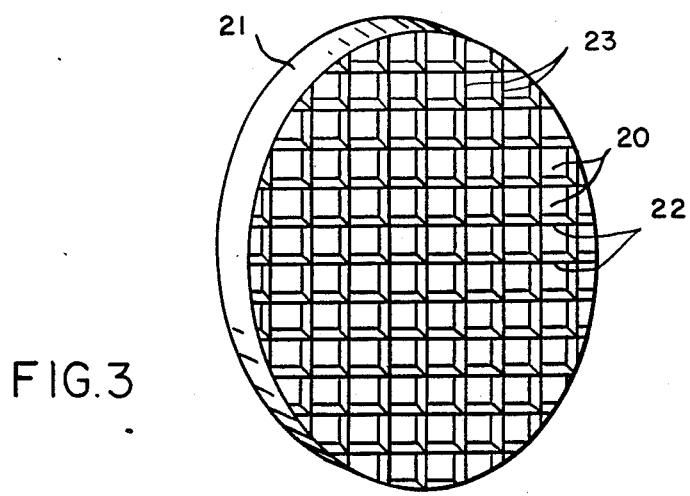
FIG. 3 depicts a particular embodiment of a structure in accordance with the invention for us in reducing reflections from an optical device.

FIG. 3 shows one preferred embodiment of a structure in accordance with the invention for substantially preventing reflections from a reflecting surface, as from the surface of a lens 10 of an optical device. As seen therein, a grid-like, or honeycomb-like, structure comprising a plurality of tubular elements 20 are fabricated within a mounting structure, such as a ring 21, having a configuration which permits the structure to be attached, in a suitable manner which would be well known to the art, at the front reflective surface of such a lens. When so attached, the tubular elements are substantially orthogonal to the reflective surface of the lens, as shown.

As used herein the term tubular element is deemed to mean an element of a generally tubular configuration having any selected geometrical cross-sectional shape. Thus, the tubular elements 20 in FIG. 3 are shown as being square in cross-section, although other shapes can be used, e.g., other rectangular configurations, a triangular configuration, an hexagonal configuration, etc., such elements capable of being suitably nested to form a substantially uniform honeycomb or grid-like overall structure. In FIG. 3, the walls of the tubular elements are, in effect, formed from a plurality of orthogonally intersecting horizontal and vertical vanes 22 and 23, respectively.

Figure 4:
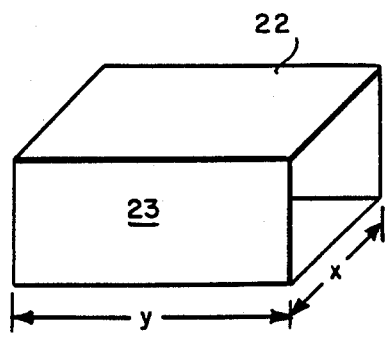
FIGS. 4 and 5 are useful in explaining the concept of aspect ratio as used in connection with the embodiment of FIG. 3.
Figure 5:
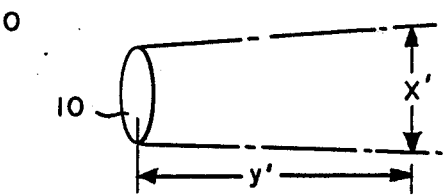

Preferably, in order to provide the most effective reduction in reflections from a reflective surface of an optical device, as from lens 10, the aspect ratio of each of the tubular elements has a selected relationship to the aspect ratio of the field of view of such optical device. As used herein, the aspect ratio of a tubular element is defined as the ratio of the width, or effective, diameter of the opening thereof to the length thereof. As shown in FIG. 4 for the square configuration such aspect ratio is defined as the ratio of x to y, where "x" is one side of the square and "y" is the length of element 20. The aspect ratio of the field of view of the optical device, e.g. lens 10, can be best understood from the diagrammatic view of FIG. 5 wherein such ratio is defined as the ratio of the width "x'" of the field of view at a some specified distance "y'" from the lens. If the aspect ratio of the tubular element is made substantially equal to the aspect ratio of the field of view of the optical device with which it is used (i.e., $x/y = x'/y'$), a substantial reduction of reflections therefrom is obtained without reducing the field of view of the optical device. That is, reflections from a light source anywhere outside the field of view of the device will not be seen by an observer who is either within or outside such field of view and reflections from a light source within the field of view of the device will not be seen by an observer who is outside the field of view.

Thus, in a typical embodiment for a lens such as a lens used in 10×50 binoculars, in which the aspect ratio of the field of view thereof is 10:1, the width of the openings of each of the tubular elements can be about 0.25 in. and the length of the tubular elements can be about 2.50 in. in order to produce a substantial reduction in reflections. A structure, such as shown in FIG. 3, is relatively simple to fabricate and would be easy to use under any conditions.

In some applications, a lesser reduction in reflections can be tolerated while still providing useful results. Thus, in some cases the aspect ratio of the tubular elements need not be substantially the same as the aspect ratio of the field of view of the optical device with which they are used. Even when the aspect ratios are somewhat different, the structure can still provide a useful reduction of reflections for some applications. While such differences in the aspect ratios tend to increase the region over which reflections can be observed, in such cases there will be less loss in light intensity and such a trade-off may be desirable in some cases.

It is found that the use of such a structure, even when providing substantial reductions in reflections, does not normally impair the ability of the optical device to be used for its desired viewing purpose. For example, if the lens 10 represents the front lens of a binocular or ocular device, the user of the device suffers substantially little or no impairment in the sharpness of the image seen therethrough. While some loss in light intensity tends to occur, it can be readily accommodated by the eyes of the user (for example, while the light intensity can be reduced by as high as 50% at when achieving substantial reflection reduction, such reduction will not really adversely affect the use of the device). Moreover, because the anti-reflection structure is relatively shorter than the focal length of the optical device, the grid-like, or honeycomb-like, structure is sufficiently out of focus that it is effectively not seen by the user of the device.

While the cross-sectional configuration of the tubular elements 20 is shown as a square, as mentioned above, the cross-section can be of other desired configurations, e.g., other rectangular shapes, triangular, hexagonal, or the like, without effecting the desired operation thereof. Generally, it is desirable that the shape selected permit the elements to be nested in a tight honeycomb-like structure so that the aspect ratios of all of the tubular elements are substantially the same.

While the structure of FIG. 3 can be made so that during use the elements 20 rest at, or substantially near to, the surface of lens 10, it is also possible to position such structure so as to provide a sufficient gap between the lens surface and the structure so that water, as from rain, or from the sea in the case of a submersible periscope device, for example, will readily drain from the device.

Figure 6:
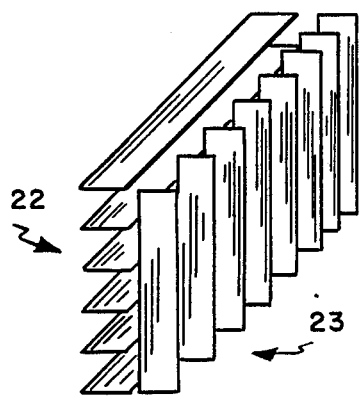
FIG. 6 depicts an alternative embodiment of the vanes of FIG. 3.
Figure 7:
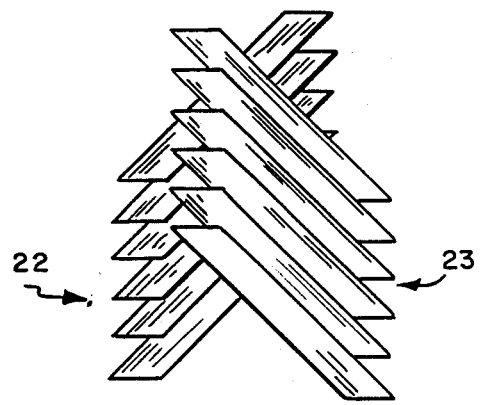
FIG. 7 depicts a still further alternative embodiment of the vanes of FIG. 3.

Alternatively, the vanes 22 can be placed in a different, but adjacent, plane from the plane of the vanes 23 in a manner such as shown in FIG. 6, where, during normal use, vanes 22 are substantially horizontally oriented and vanes 23 are substantially vertically oriented. Water will be blocked from entering the openings between vanes 22 and will readily drain through vanes 23. In a still further alternative embodiment as shown in FIG. 7 both sets of orthogonally related vanes can be arranged at 45° angles from a horizontal orientation so that, during normal use, water can be readily drained through both sets thereof. To further assist such drainage, the vanes can be coated with a suitable hydrophillic material.

Moreover, the vanes can be arranged to be heated in any suitable manner to remove snow or ice therefrom. For example, the use of electrically conductive material, either for the vanes themselves or as a material attached to the vanes, can permit them to be heated from an electrical power source to melt ice or snow therefrom during use.

In some optical devices, the device may use a reflective laser filter mounted within the housing of an optical device which filter structure is highly reflective particularly in selected regions of the visible spectrum. In such devices, it may be desirable to position a honeycomb-like structure of the invention directly in front of such filter within the device housing rather than at the exterior of the housing at the front lens thereof.

Further alternative structures may be used in some applications, if desired. For example, the anti-reflection structure may be in the form of concentric rings, or cylindrical elements, such as shown in FIG. 8 wherein a plurality of rings 25 are attached to each other by suitable struts 26 at opposite points thereon. The spacing 27 between the rings is substantially the same. The aspect ratio of the centermost ring 25A is selected to be substantially the same as that of the field of view of the optical device on which it is used, the remaining rings being spaced so that the width of the slot formed by each ring and its adjacent ring approximately maintains the desired aspect ratio. Such a structure can also provide adequate anti-reflection capability in many applications.

The structure of FIG. 8 can be modified to provide a structure as shown in FIG. 9 wherein a plurality of interconnecting struts 28 effectively form honeycomb-like, or grid-like, elements 29. In such a structure, the cross-sectional areas of elements 29 are arranged to be approximately equal so that their aspect ratios are also approximately the same and approximately equal to the aspect ratio of the field of view of the optical device with which they are used.

The tubular elements shown in the various above described embodiments of the invention are generally positioned so as to be substantially orthogonal to the reflective surface with which they are used. In some applications, it may be desirable to arrange them so that they are at other than a 90° angle with respect to the reflective surface in question. For example, FIG. 10 depicts an anti-reflective structure used with a non-optical device, the term non-optical being used here in the sense that the device does not provide any optical magnification. Such a device might be a mirror or a glass surface, such as a vehicle windshield 30 shown diagrammatically in FIG. 10 in a top view thereof. The vanes 31 which form the elements 32 are generally placed at various angles α, other than 90°, with respect to the reflective surface of windshield 30 so as to follow the natural sight lines in the horizontal direction of an observer 33 looking through the windshield. FIG. 11 shows the vanes as positioned in the vertical direction wherein such vanes can be, if desired, arranged generally orthogonally to the windshield surface, the tubular elements of the overall structure being thereby positioned at various angles with respect to the reflective surface of windshield 30. The aspect ratios of each of the honeycomb-like elements 34, which are so formed, are selected to be substantially the same and can be selected as exemplified in FIG. 12. As seen therein, an exemplary aspect ratio (x/y) is depicted by the sides of rectangle 35 as shown. A desired aspect ratio can be selected to reduce reflections from sunlight, for example, which is expected to be directed at an angle with respect to the horizontal. For example, if the aspect ratio (x/y) of rectangle 35 is selected, reflections to an observer 36, for example, would be substantially reduced for sunlight angles greater than θ, but would not be so reduced for angles less than θ. Accordingly, the minimum angle from which sunlight is expected to be directed at the surface of the windshield 30 during use can be estimated, and the aspect ratio of elements 34 is appropriately selected as shown in FIG. 12 to reduce reflections of sunlight directed at such minimum angle, or greater.

Structures in accordance with the invention can be relatively easily fabricated for use with the surfaces of many different types of optical devices or other reflective surfaces. Thus, in addition to use on binoculars, telescopes, periscopes, and the like, the structure can be used on vehicular windshields, head lamps, or side view mirrors, or the like.

Other modifications of the invention will occur to those in the art within the spirit and scope of the invention. Hence, the invention is not to be construed as limited to the particular embodiments discussed and shown in the figures, except as defined by the appended claims.

What is claimed is:

1. A structure for reducing reflections from a light reflective surface of an optical device having a field of view with an aspect ratio, said structure comprising:
a plurality of substantially tubular elements, each having an aspect ratio, mounted in front of said reflective surface, the aspect ratio of each of said tubular elements having a selected relationship with respect to the aspect ratio of the field of view of said optical device to substantially reduce said reflections.

2. A structure in accordance with claim 1, wherein the aspect ratio of each of said tubular elements is substantially the same as the aspect ratio of the field of view of said optical device.

3. A structure in accordance with claim 1, wherein said tubular elements are mounted substantially orthogonally to said reflective surface.

4. A structure in accordance with claim 3, wherein all of said tubular elements have substantially the same cross-sectional configuration.

5. A structure in accordance with claim 4, wherein said cross-sectional configuration is rectangular.

6. A structure in accordance with claim 4, wherein said cross-sectional configuration is a square.

7. A structure in accordance with claim 4, wherein said cross-sectional configuration is hexagonal.

8. A structure in accordance with claim 4, wherein said cross-sectional configuration is triangular.

9. A structure in accordance with claim 3 wherein said structure is formed from a first plurality of parallel vane and a second plurality of parallel vanes arranged orthogonally to said first plurality of vanes.

10. A structure in accordance with claim 9, wherein, during use of the optical device, said first plurality of vanes are horizontally oriented said second plurality of vanes are substantially vertically oriented.

11. A structure in accordance with claim 9, wherein, during use of the optical device, said first and second vanes are at substantially a 45° angle with respect to a horizontal orientation.

12. A structure in accordance with claim 9 wherein the surfaces of said first and second vanes are coated with hydrophillic material.

13. A structure in accordance with claim 1, wherein the aspect ratio of each of said tubular elements is different from the aspect ratio of the field of view of said optical device.

14. A structure in accordance with claim 1, wherein said plurality of tubular elements form a honeycomb-like structure.

15. A structure in accordance with claim 1, wherein said structure is mounted so as to provide a gap between said structure and said reflective surface.

16. A structure for reducing reflections from a light reflective surface of an optical device having a field of view with an aspect ratio comprising
a plurality of tubular elements, each having an aspect ratio, mounted in front of, and orthogonally to, said reflective surface, the aspect ratio of each of said tubular elements having a selected relationship with respect to the aspect ratio of the field of view of said optical device to prevent reflections of light rays from a light source outside the field of view of said optical device from being observed by an observer within or outside said field of view and to prevent reflections of light rays from a light source within said field of view from being observed by an observer outside said field of view.

17. A structure in accordance with claim 16, wherein said tubular elements comprise a plurality of concentrically mounted cylindrical elements.

18. A structure in accordance with claim 17, and further including a plurality of vanes interconnecting said concentric cylindrical elements to form a plurality of substantially tubular elements each having substantially the same cross-sectional area, the aspect ratios of said tubular elements being substantially the same.

19. A structure in accordance with claim 18, wherein said structure is mounted in front of the reflective surface of an optical device, the aspect ratios of said tubular elements having a selected relationship with respect to the aspect ratio of the field of view of said optical device.

20. A structure in accordance with claim 19, wherein the aspect ratios of said tubular elements are selected to reduce reflections from light sources which direct light on to said reflective surface at angles equal to or greater than a selected angle.

21. A structure in accordance with claim 1 or 16, wherein said tubular elements are positioned at various angles with respect to said reflective surface.

22. A structure in accordance with claim 21, wherein said reflective surface is a glass reflective surface said various angles being selected to correspond to the sight lines of an observer looking through said glass reflective surface.

* * * * *